(No Model.)

F. C. MOTLEY.
VELOCIPEDE BRAKE.

No. 584,392. Patented June 15, 1897.

Witnesses
B. W. Miller
E. N. Palloch

Inventor
Francis Charles Motley,
By his Attorneys,
Baldwin Davidson & Wight

UNITED STATES PATENT OFFICE.

FRANCIS CHARLES MOTLEY, OF LONDON, ENGLAND.

VELOCIPEDE-BRAKE.

SPECIFICATION forming part of Letters Patent No. 584,392, dated June 15, 1897.

Application filed September 5, 1896. Serial No. 605,020. (No model.)

*To all whom it may concern:*

Be it known that I, FRANCIS CHARLES MOTLEY, a subject of the Queen of Great Britain, residing at 13 Coombedale Road, East Greenwich, London, in the county of Kent, England, have invented a certain new and useful Brake for Velocipedes, of which the following is a specification.

The object of this invention is to provide a simple and efficient brake which can be easily attached to and detached from the machine.

Figure 1:
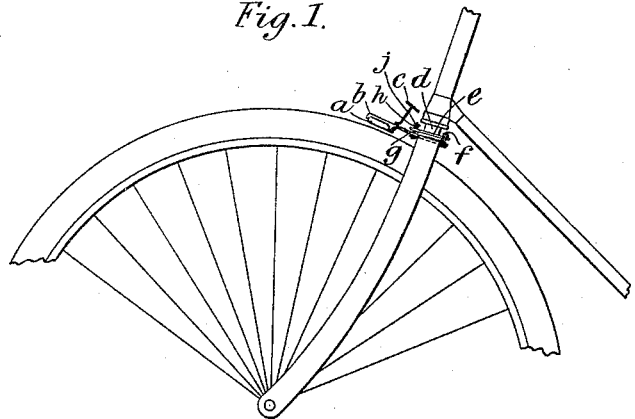
Figure 2:
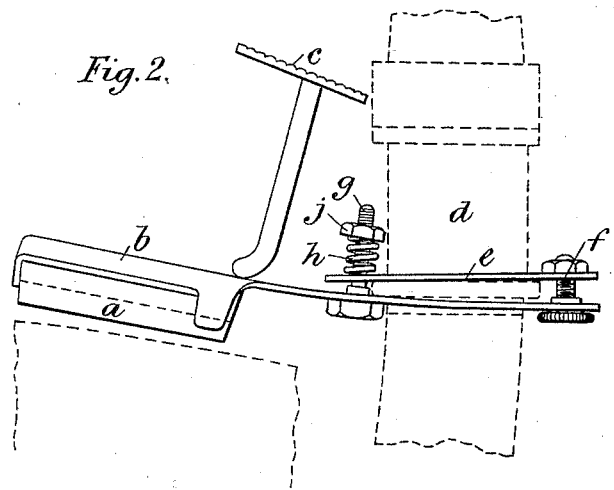
Figure 3:
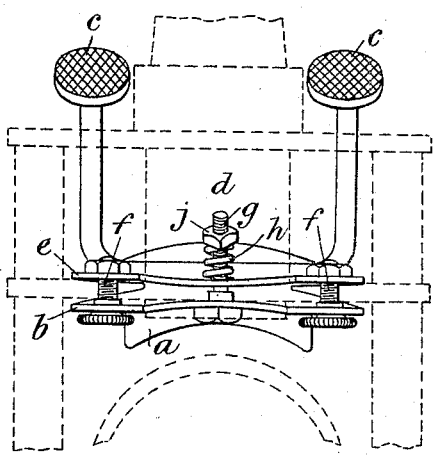
Figure 4:
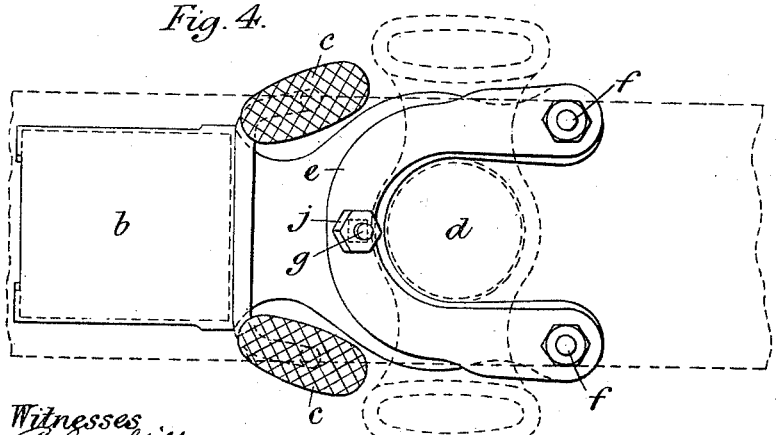

Figure 1 is a side elevation of part of a bicycle having the improved brake attached. Fig. 2 is a side elevation; Fig. 3, a rear elevation; and Fig. 4, a plan of the brake, full size, the adjacent parts of the bicycle being shown in dotted lines.

The brake consists of a pad $a$, of india-rubber or other material, attached to the under side of a plate $b$, the top of which carries a foot rest or rests $c$. This plate is attached elastically just above the wheel to the head $d$ at the top of the fork, so that it can be slightly depressed and the brake applied by placing the foot or feet upon the rest. Preferably this is done, as shown, by employing a second plate $e$, of a U form, above the rear end of the first, the two plates embracing between them the head $d$ and being connected together at their rear ends by bolts $f$ or otherwise, while at their forward end they are connected by a bolt $g$, having around it a helical spring $h$, between the upper plate and the nut $j$.

What I claim is—

The combination of the plate $b$, the brake-block $a$ secured to the under side thereof, the foot-rest $c$ connected with the upper side, the plate $e$ arranged above an extension of the plate $b$, the bolts $f$ for securing the plates $b$ and $e$ together, and the bolt and spring $h$ for yieldingly securing the plates $b$ and $e$ together at one end.

FRANCIS CHARLES MOTLEY.

Witnesses:
   J. W. CLEAVE,
   CHARLES E. MOTLEY.